(12) United States Patent
Kim

(10) Patent No.: US 7,322,429 B2
(45) Date of Patent: Jan. 29, 2008

(54) PORTABLE DRILLING MACHINE

(76) Inventor: Jong Oh Kim, 761-10 Wongok-dong, Danwon-ku, Ansan city, Kyungki-do (KR)

( * ) Notice: Subject to any disclaimer, the term of this patent is extended or adjusted under 35 U.S.C. 154(b) by 8 days.

(21) Appl. No.: 11/319,070

(22) Filed: Dec. 28, 2005

(65) Prior Publication Data
US 2006/0147284 A1 Jul. 6, 2006

(30) Foreign Application Priority Data
Dec. 30, 2004 (KR) .................. 10-2004-0116203
Aug. 22, 2005 (KR) .................. 10-2005-0076676

(51) Int. Cl.
B23B 47/34 (2006.01)
(52) U.S. Cl. .................. 173/198; 173/171; 408/56; 408/67
(58) Field of Classification Search .............. 173/198, 173/75, 217, 171; 408/56, 67
See application file for complete search history.

(56) References Cited

U.S. PATENT DOCUMENTS

| | | | | |
|---|---|---|---|---|
| 3,583,821 A | * | 6/1971 | Shaub et al. | 408/72 R |
| 4,037,982 A | * | 7/1977 | Clement | 408/61 |
| 4,097,176 A | * | 6/1978 | Wanner et al. | 408/56 |
| 4,209,069 A | * | 6/1980 | Smith | 173/75 |
| 4,921,375 A | * | 5/1990 | Famulari | 408/67 |
| 5,024,562 A | * | 6/1991 | Arai et al. | 408/1 R |
| 5,069,695 A | * | 12/1991 | Austin | 55/385.1 |
| 5,129,467 A | * | 7/1992 | Watanabe et al. | 173/75 |
| 5,332,343 A | * | 7/1994 | Watanabe et al. | 409/136 |
| 5,356,245 A | * | 10/1994 | Hosoi et al. | 408/56 |
| 5,395,187 A | * | 3/1995 | Slesinski et al. | 408/1 R |
| 5,688,082 A | * | 11/1997 | Richardson | 408/67 |
| 5,791,842 A | * | 8/1998 | Sugata | 409/137 |
| 6,079,078 A | * | 6/2000 | Byington | 15/339 |
| 6,146,066 A | * | 11/2000 | Yelton | 409/134 |
| 6,164,881 A | * | 12/2000 | Shono | 409/137 |
| 6,851,898 B2 | * | 2/2005 | Ege et al. | 408/67 |

* cited by examiner

*Primary Examiner*—Scott A. Smith
(74) *Attorney, Agent, or Firm*—Lowe Hauptman Ham & Berner LLP

(57) ABSTRACT

A portable drilling machine includes a housing; a drill chuck positioned on a front surface of the housing; a drill bit detachably coupled to the drill chuck; a driver positioned inside the housing to provide either the drill bit or the drill chuck with a rotational driving force; an anti-dust cover having a rear anti-dust cover formed in a cup shape with a drill through-hole formed in a central region of a bottom surface of the rear anti-dust cover and a front anti-dust cover formed in a tube shape to be coupled to the rear anti-dust cover, the front anti-dust cover being adapted to move towards the bottom surface of the rear anti-dust cover when acted on by pressure towards the housing and return to original position when the pressure is removed; and a retainer for detachably coupling the rear anti-dust cover to an outer surface of either the housing or the drill chuck. The rotational motion of the drill bit is not interfered with by the anti-dust cover, and the dust collection space is increased.

5 Claims, 19 Drawing Sheets

PORTABLE DRILLING MACHINE

BACKGROUND OF THE INVENTION

1. Field of the Invention

The present invention relates to a portable drilling machine, and more particularly to a portable drilling machine adapted to be carried by an operator to perform drilling operation.

2. Description of the Prior Art

As generally known in the art, portable drilling machines are used to drill holes in walls when, for example, anchors need to be installed at a construction site related to electricity, facility, or hardware. Korean Patent Application No. 2000-11714 (entitled "Multi-functional dust collection device for drill") discloses a portable drilling machine having a means for collecting dust, which is created during drilling operation.

FIG. 18 is an exploded perspective view of a conventional portable drilling machine, and FIG. 19 is an assembled perspective view thereof.

A conventional portable drilling machine, as shown in the drawings, includes a drill 110, a dust collector 120 coupled to the front end of the drill 110, and a drilling depth regulator 140 coupled to the upper end of the dust collector 120.

The drill 110 includes a housing 111 having a neck 111a formed on its front surface, a drill chuck 112 coupled to the front end of the neck 111a, a drill bit 113 detachably coupled to the drill chuck 112, and a driver (not shown) placed inside the housing 111.

The driver (not shown) provides either the drill bit 113 or the drill chuck 112 with a rotational driving force in response to switch operation from the operator.

The dust collector 120 has a corrugated tube 122 detachably coupled to the neck 111a by a clamp 121.

The corrugated tube 122 is adapted to extend and retract.

The drilling depth regulator 140 includes a retaining tube 141 coupled to the upper side of the clamp 121, a guide tube 142 fixedly inserted into the retaining tube 141, and an actuating rod 143 inserted into the guide tube 142 while being able to slide.

The front end of the actuating rod 143 is retained by a bracket 144, which is positioned on the upper surface of the front end of the corrugated tube 122.

The conventional portable drilling machine, constructed as above, is operated as follow: the front end of the corrugated tube 112 is pressed against a to-be-drilled surface so that it is kept in contact with the surface. Then, the drill bit 113 or the drill chuck 112 is rotated to perform drilling operation.

Dust created during the drilling operation is directed to the interior of the corrugated tube 122 for collection.

When the drilling operation is over, the corrugated tube 122 is separate to remove the collected dust.

However, the conventional portable drilling machine has a problem in that, when the corrugated tube 122 extends/retracts with a slant relative to the longitudinal direction of the drill bit 113 during drilling operation, the corrugated tube 122 may interfere with the rotational motion of the drill bit 113 (i.e. drilling operation) by making contact with it.

In addition, the inner diameter of the corrugated tube 122 depends on the diameter of the neck 111a, because the corrugated tube 122 is coupled to the neck 111a by the clamp 121. This means that dust collection space is limited.

SUMMARY OF THE INVENTION

Accordingly, the present invention has been made to solve the above-mentioned problems occurring in the prior art, and an object of the present invention is to provide a portable drilling machine capable of preventing an anti-dust cover from interfering with the rotational motion of a drill bit and increasing dust collection space.

In order to accomplish this object, there is provided a portable drilling machine including a housing; a drill chuck positioned on a front surface of the housing; a drill bit detachably coupled to the drill chuck; a driver positioned inside the housing to provide either the drill bit or the drill chuck with a rotational driving force; an anti-dust cover having a rear anti-dust cover formed in a cup shape with a drill through-hole formed in a central region of a bottom surface of the rear anti-dust cover and a front anti-dust cover formed in a tube shape to be coupled to the rear anti-dust cover, the front anti-dust cover being adapted to move towards the bottom surface of the rear anti-dust cover when acted on by pressure towards the housing and return to original position when the pressure is removed; and a retainer for detachably coupling the rear anti-dust cover to an outer surface of either the housing or the drill chuck.

Preferably, the front anti-dust cover is formed as a corrugated tube adapted to retract towards the bottom surface of the rear anti-dust cover when acted on by pressure towards the housing and extend to original position when the pressure is removed, in order to simply the coupling structure between the front and rear anti-dust covers and maintain stable movement of the front anti-dust cover.

Preferably, the rear anti-dust cover has a pair of retaining posts formed on a peripheral wall of the rear anti-dust cover while facing each other and a linear retaining slot defined between the retaining posts in a longitudinal direction of the rear anti-dust cover, the front anti-dust cover being coupled to the rear anti-dust cover by a fastener inserted into the retaining slot, in order to adjust the degree of extension/retraction of the front anti-dust cover.

A filling member may be mounted in the retaining slot, in order to prevent dust, which is collected by the rear anti-dust cover, from scattering via the retaining slot and stably maintain the coupling condition of front anti-dust cover.

Preferably, the filling member has a pair of screening members formed on both sides of the fastener, respectively, and a connector for connecting the screening members to each other along the longitudinal direction, so that the filling member can be easily mounted in the retaining slot.

Preferably, the retainer has a chuck retainer detachably coupled to the drill chuck and a bearing interposed between the chuck retainer and the rear anti-dust cover, so that dust occurring during the drilling operation does not penetrate into the housing.

The chuck retainer may have a compression tube and a fastening tube, the compression tube having a number of fastening ribs formed on an outer surface of the compression tube as threads and a plurality of auxiliary compression grooves formed on an edge of a lower end of the compression tube, the fastening tube having female screws formed on an inner surface of the fastening tube, and the female screws corresponding to the fastening ribs.

Preferably, the chuck retainer has an auxiliary tube made of an elastic material to be mounted on an inner surface of the compression tube, so that the drill chuck and the compression tube are stably pressed against each other.

Preferably, at least one of the rear and front anti-dust covers is made of a transparent material, so that the drilling operation can be easily checked by the naked eye.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
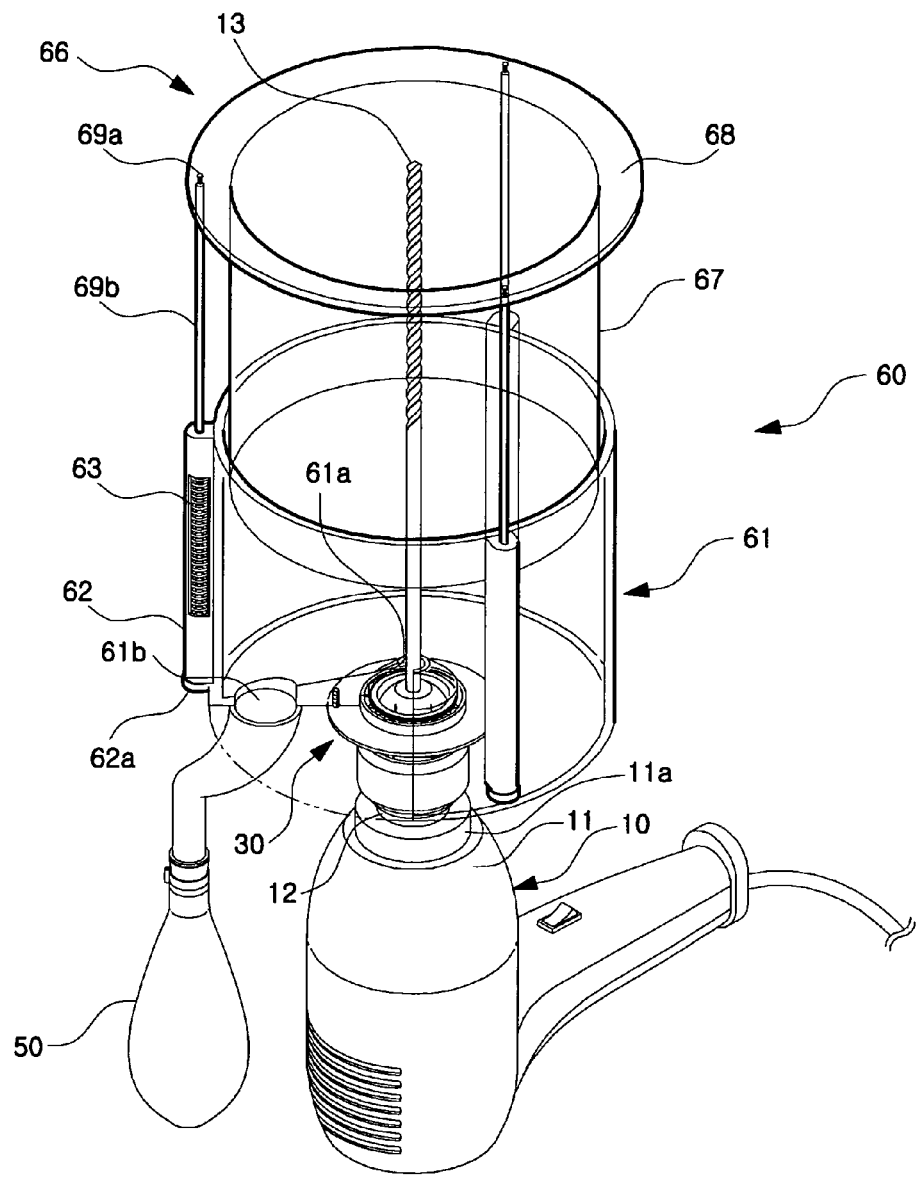
FIG. 1 is a coupled perspective view showing a portable drilling machine according to an embodiment of the present invention.

Hereinafter, a preferred embodiment of the present invention will be described with reference to the accompanying drawings. In the following description and drawings, the same reference numerals are used to designate the same or similar components, and so repetition of the description on the same or similar components will be omitted.

Figure 2:
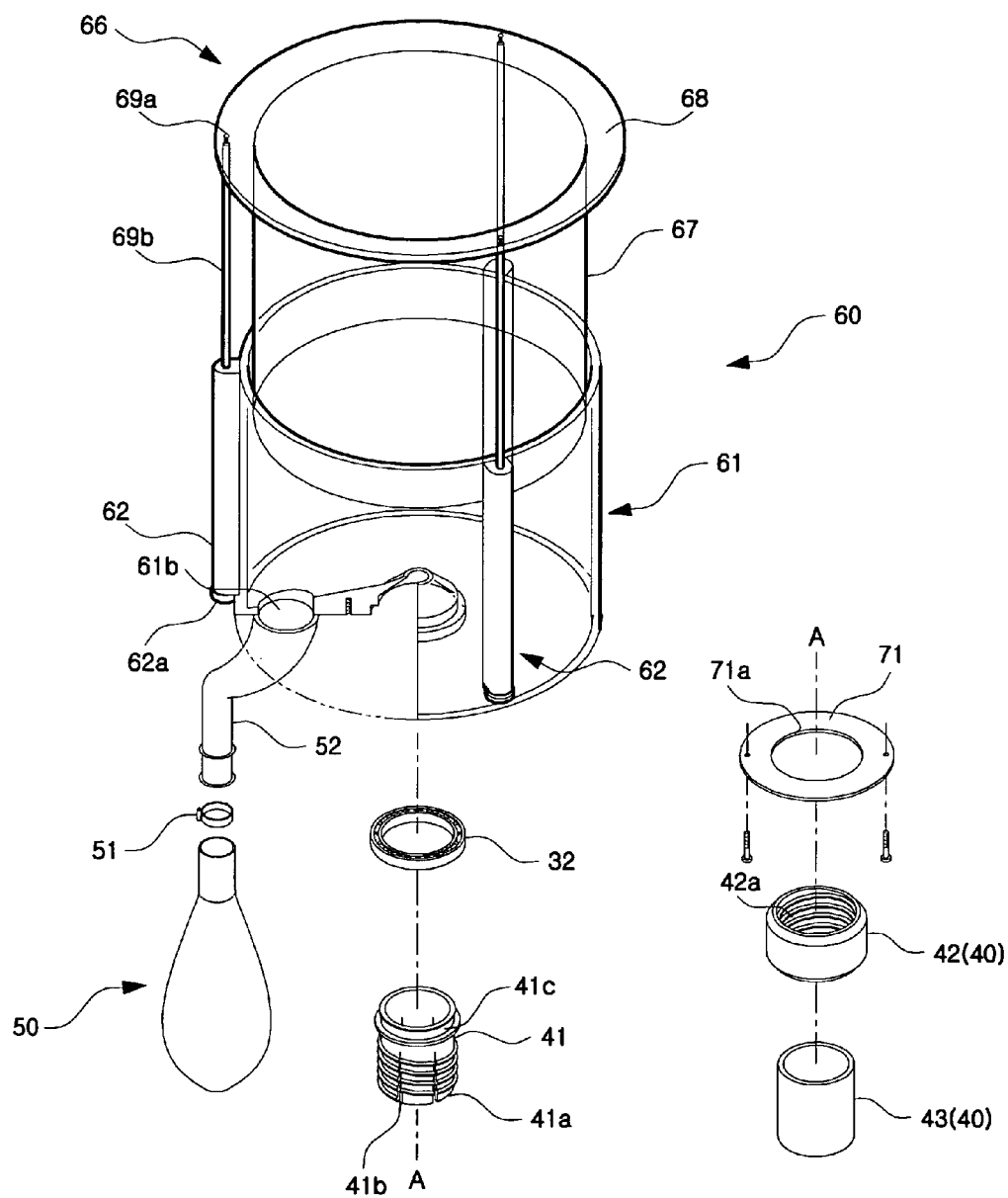
FIGS. 2, 3, and 4 are exploded perspective views showing a portable drilling machine according to an embodiment of the present invention.
Figure 3:
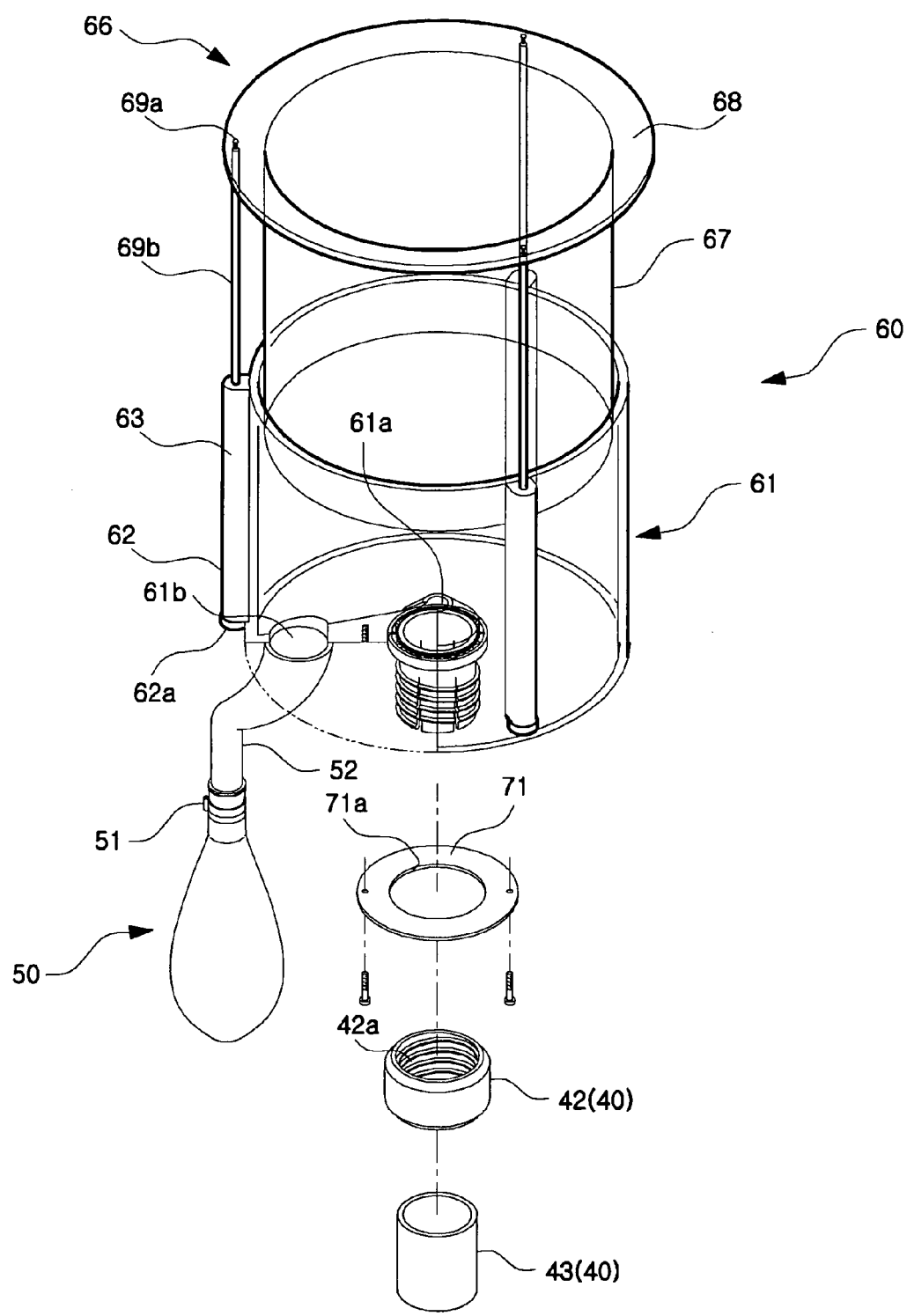
Figure 4:
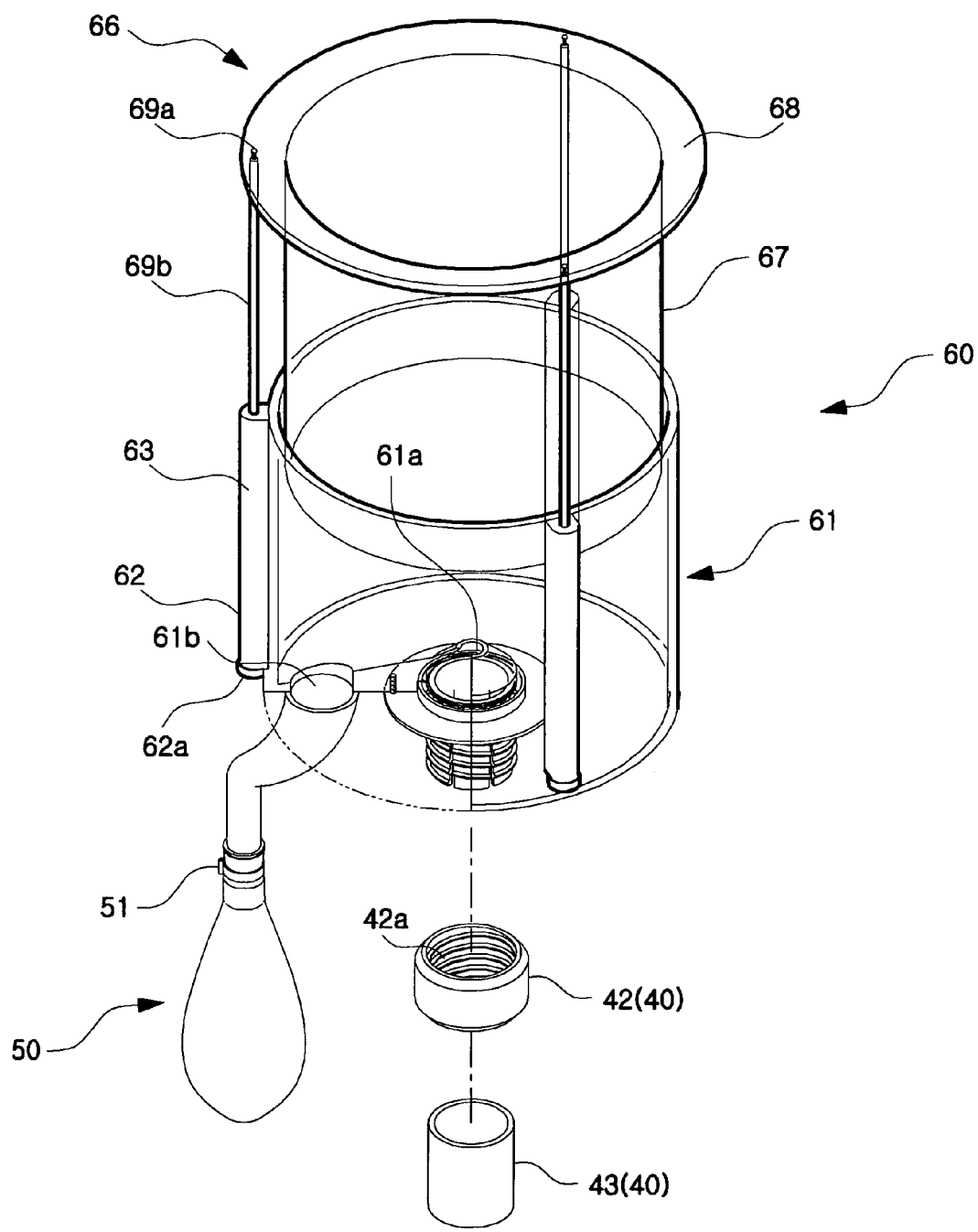
Figure 5:
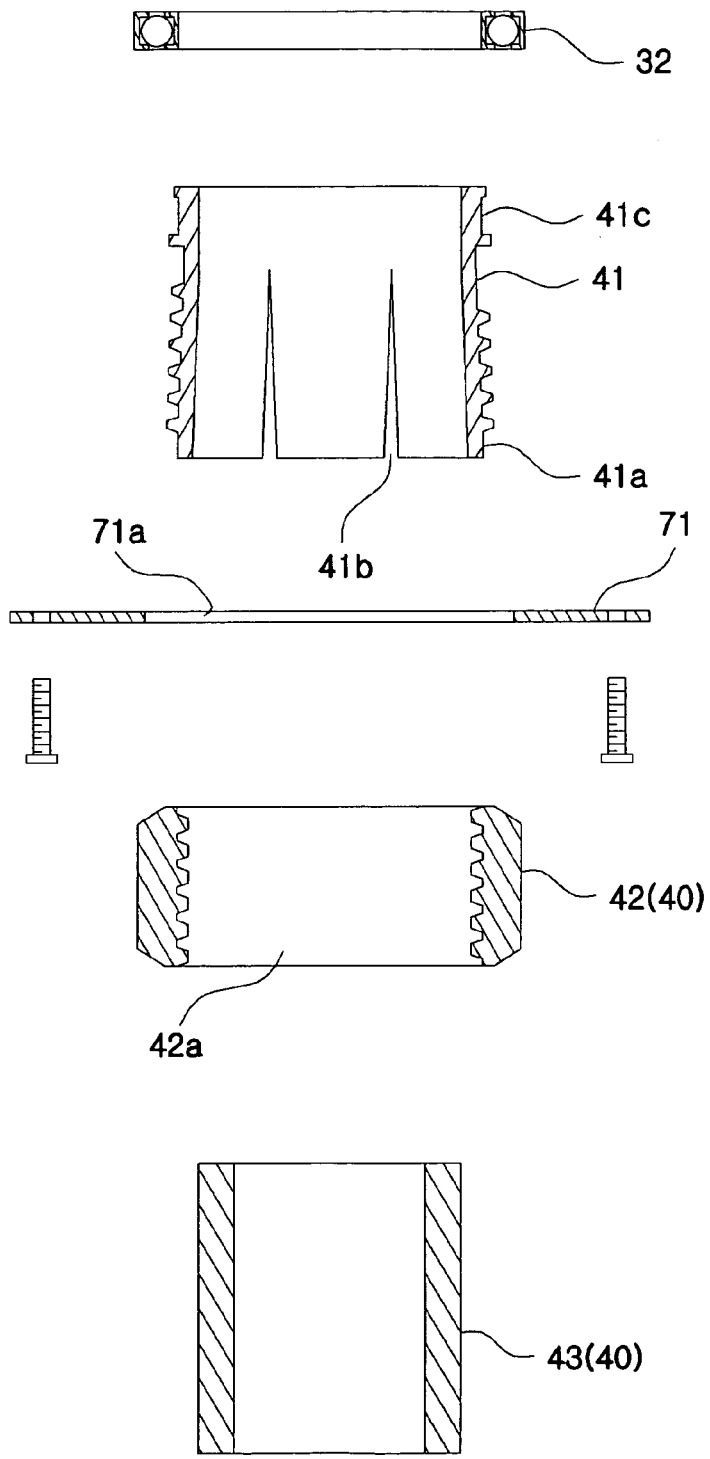
FIGS. 5, 6, 7, and 8 are exploded sectional views showing a portable drilling machine according to an embodiment of the present invention.
Figure 6:
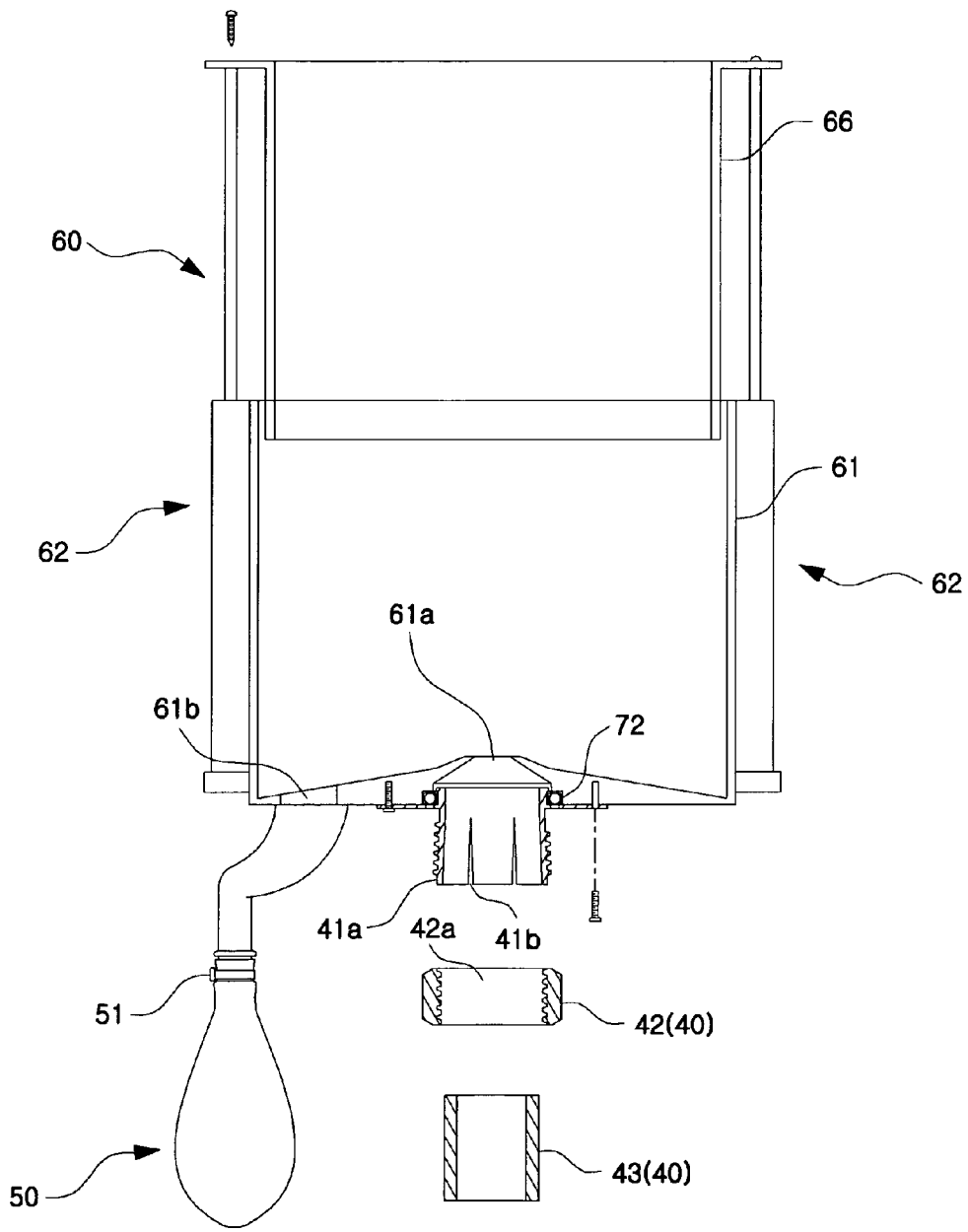
Figure 7:
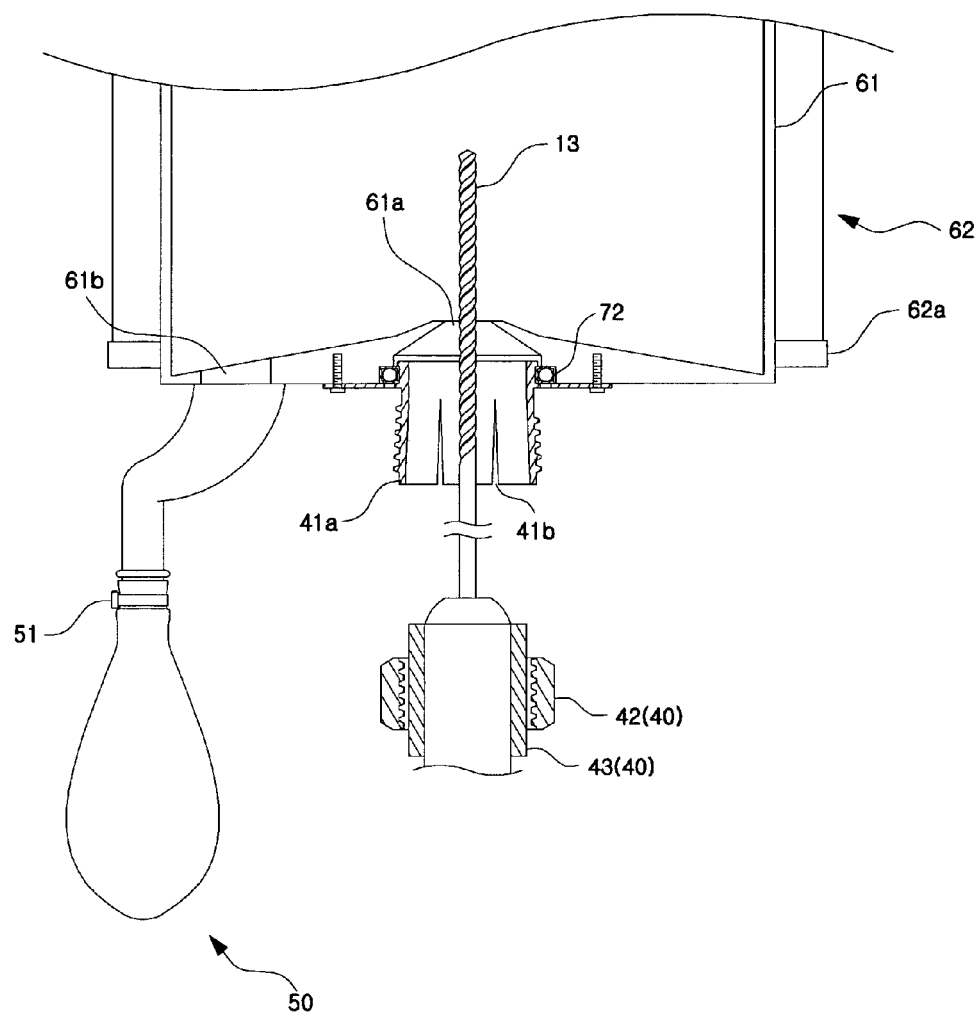
Figure 8:
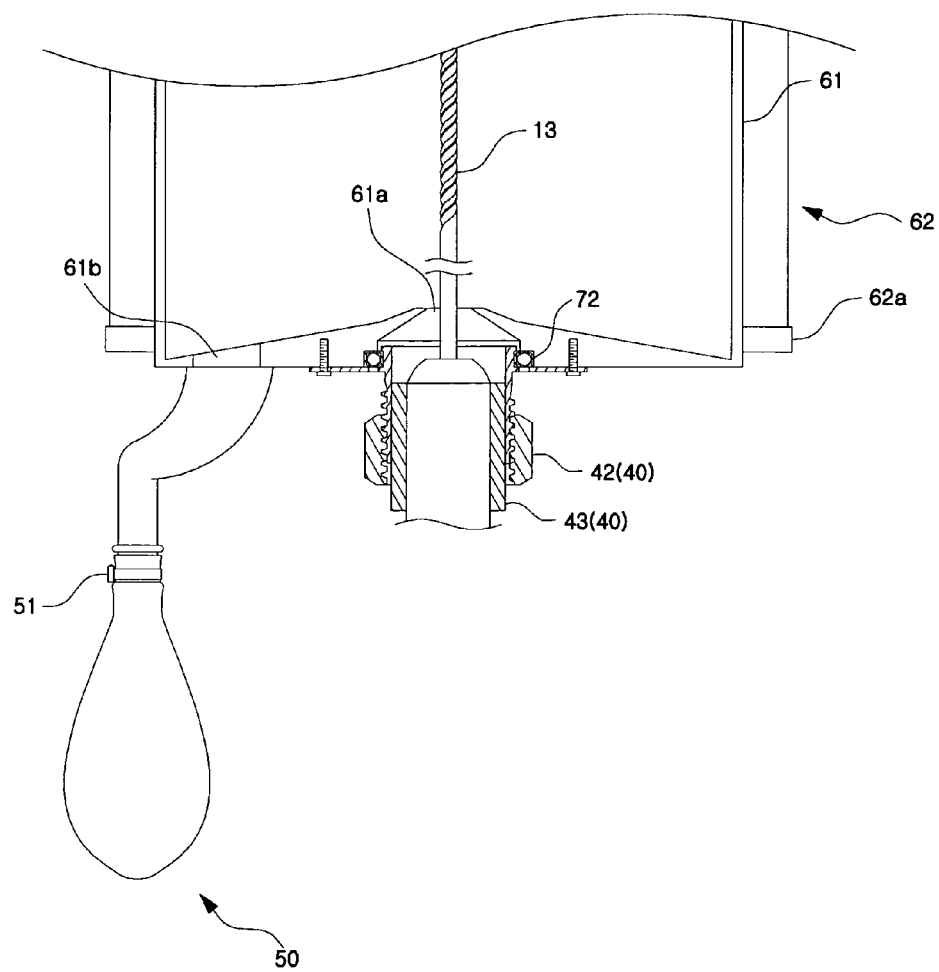
Figure 9:
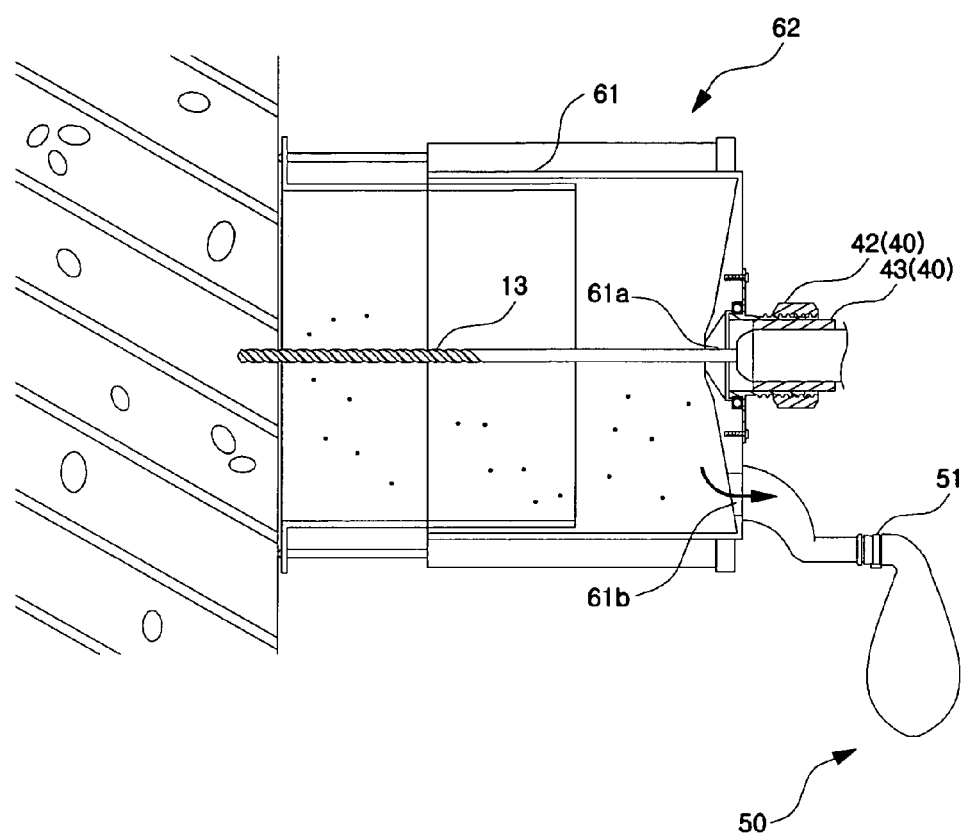
FIG. 9 shows the operation of a portable drilling machine according to an embodiment of the present invention.

FIG. 1 is a coupled perspective view showing a portable drilling machine according to an embodiment of the present invention. FIGS. 2, 3, and 4 are exploded perspective views showing a portable drilling machine according to an embodiment of the present invention. FIGS. 5, 6, 7, and 8 are exploded sectional views showing a portable drilling machine according to an embodiment of the present invention.

A portable drilling machine according to an embodiment of the present invention, as shown in the drawings, includes a drill 10, an anti-dust cover 60 for enclosing the drill bit 13, a retainer 30 for detachably coupling the anti-dust cover 60 to the outer surface of the drill chuck 12, and a collection bag 50 connected to the inner space of the anti-dust cover 60.

The drill 10 includes a housing 11 having a neck 11a formed on its front surface, a drill chuck 12 coupled to the front end of the neck 11a, a drill bit 13 detachably coupled to the drill chuck 12, and a driver (not shown) placed inside the housing 11.

The driver (not shown) provides either the drill bit 13 or the drill chuck 12 with a rotational driving force in response to switch operation from the operator.

The anti-dust cover 60 includes a rear anti-dust cover 61 made of a transparent material (e.g. transparent plastic) in the shape of a cup having a circular section to be coupled to the retainer 30 by a bearing 32 (described later) and a front anti-dust cover 66 made of a transparent material in the shape of a tube having a circular section to be coupled to the rear anti-dust cover 61.

The anti-dust cover 60 encloses the drill bit 13 in such a manner that the front end of the drill bit 13 does not protrude from the front open surface of the anti-dust cover 60.

The rear anti-dust cover 61 has a drill through-hole 61a formed at the center of the bottom surface thereof and a dust discharge hole 61b formed adjacent to the drill through-hole 61a.

The rear anti-dust cover 61 has three downward movement guides 62 formed on the outer surface of the lateral wall thereof with an angular spacing of 120° and extending in the height direction.

Each downward movement guide 62 has a guide space formed therein in the longitudinal direction and a spring 63 positioned in the lower portion of the guide space in an upright position. In addition, each downward movement guide 62 has a spring containing cap 62a screw-coupled to the lower end thereof so that the spring 63 can be inserted into the guide space from the exterior.

The rear anti-dust cover 61 has a cover fixing plate 71 attached to the outer surface of the bottom surface thereof.

The cover fixing plate 71 has a receiving hole 71a formed at the center thereof, in which a chuck retainer 40 is received (described later).

The rear anti-dust cover 61 has an outer bearing groove 72 formed on the outer surface of the bottom surface thereof, in order to receive an outer race of the bearing 32 while cooperating with the cover fixing plate 71.

The front anti-dust cover 66 includes a body 67 formed in the shape of a tube having a circular section and a flange 68 extending from the entire peripheral edge of the body 67 at a right angle.

The front anti-dust cover 66 is coupled to the rear anti-dust cover 61 by connecting the flange 68 to the upper end of three connection rods 69b with fixing screws 69a and coupling the upper end of each spring 63 to the lower end of each connection rod 69b. When the front anti-dust cover 66 is coupled to the rear anti-dust cover 61, the outer surface of the body 67 makes surface contact with the inner surface of the rear anti-dust cover 61.

When acted on by pressure from a to-be-drilled surface towards the housing 11, the front anti-dust cover 66 slides towards the bottom surface of the rear anti-dust cover 61 and, when the pressure is removed, it returns to the original position.

The retainer 30 includes a chuck retainer 40 detachably coupled to the drill chuck 12 and a bearing 32 interposed between the chuck retainer 40 and the rear anti-dust cover 61.

The chuck retainer 40 includes a compression tube 41 made of a flexible material (e.g. plastic) with a number of fastening ribs 41a formed on the outer surface thereof as threads; a fastening tube 42 having female screws 42a formed on the inner surface thereof, which correspond to the fastening ribs 41a; and an auxiliary tube 43 made of an elastic material (e.g. rubber) to be mounted on the inner surface of the compression tube 41.

The compression tube 41 has a plurality of auxiliary compression grooves 41b formed on the edge of the lower end thereof and an inner bearing groove 41c formed on the outer surface of the upper end thereof in an approximately U-shaped configuration to receive an inner race of the bearing 32.

The bearing 32 is contained in a space between the outer bearing groove 72 and the inner bearing groove 41c.

The collection bag 50 is coupled to the lower end of a conduit 52 by a band 51.

A method for coupling the anti-dust cover 60 to the drill 10 will now be described.

The bearing 32 is mounted on the inner bearing groove 41c of the compression tube 41 in a press fit mode.

After being mounted on the compression tube 41, the bearing 32 is inserted into the outer bearing groove 72.

The cover fixing plate 71 is inserted into the compression tube 41 via the receiving hole 71a and is screw-coupled to the bottom surface of the rear anti-dust cover 61.

The auxiliary tube 43 is inserted into and mounted on the interior of the compression tube 41.

The fastening tube 42 is inserted into and mounted on the drill chuck 12.

The compression tube 41 is inserted into and mounted on the drill chuck 12 in such a manner that the auxiliary compression groove 41b faces the fastening tube 42.

The fastening tube 42 is rotated so that the fastening ribs 41a of the compression tube 41 interact with the female screws 42a of the fastening tube. As a result of the interaction, the fastening tube 42 advances towards the front end of the drill bit 13, and the inner surface of the auxiliary tube 43 is forced against the outer surface of the drill chuck 12.

The chuck retainer 40 rotates while being interlocked with the rotation of the drill chuck 12, but the anti-dust cover 60 does not.

When drilling operation is to be performed using the portable drilling machine according to an embodiment of the present invention, constructed as above, the front end of the front anti-dust cover is pressed against a to-be-drilled surface so that the front end is kept in contact with the surface. Then, the drill bit 13 or the drill chuck 12 is rotated to perform drilling operation. The collection bag 50 is directed towards the ground, due to its own weight, during the drilling operation.

As the drilling operation proceeds, the front anti-dust cover 66 continuously recedes while being pressed against and being kept in contact with the to-be-drilled surface.

Dust created during the drilling operation is first gathered by the anti-dust cover 60 and then transferred to the collection bag 50 via the dust discharge hole 61b.

When the drilling operation is finished, the collection bag 50 is separated to remove the collected dust.

As mentioned above, the portable drilling machine according to an embodiment of the present invention is advantageous in that the anti-dust cover 60 includes front and rear anti-dust covers 61 and 60, which are adapted to move relative to each other during drilling operation, so that the rotational motion of the drill bit 13 (i.e. drilling operation) is not interfered with by contact with the anti-dust cover 60 and the dust collection space is increased.

In addition, dust is prevented from penetrating into the housing 11, because a chuck retainer 40 is detachably coupled to the drill chuck 12 so that the retainer 30 can rotate while being interlocked with the drill chuck 12, and a bearing 32 is interposed between the chuck retainer 40 and the rear anti-dust cover 61. In the case of a conventional drilling machine, in contrast, dust may move from the corrugated tube 122, which is coupled to the neck 111a, into the housing 111 and cause the driver to malfunction.

Since the chuck retainer 40 has an auxiliary tube 43 made of an elastic material to be mounted on the inner surface of the compression tube 41, the drill chuck 12 and the compression tube 41 are stably pressed against each other even when the diameter of the drill chuck 12 varies.

The rear and front anti-dust covers 61 and 66 are made of a transparent material and enable the operator to easily check the drilling depth.

Dust is efficiently dealt with during the drilling operation by gathering it first in the anti-dust cover 60 and then transferring it to the collection bag 50.

Although the front anti-dust cover is adapted to slide towards the bottom surface of the rear anti-dust cover in the above embodiment of the present invention, it may also be adapted to move based on extension/retraction.

Figure 10:
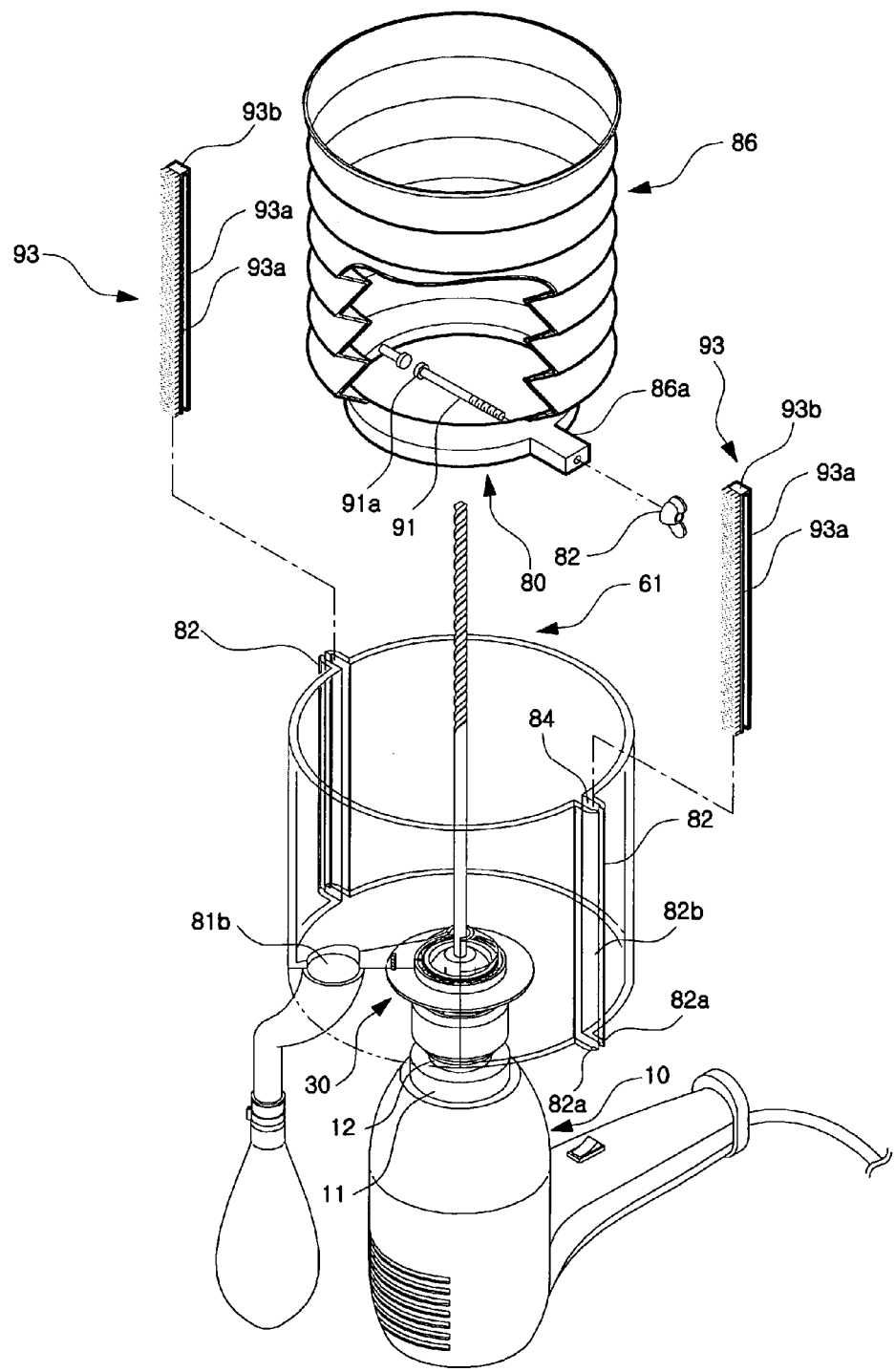
FIGS. 10, 11, and 12 are exploded perspective views showing a portable drilling machine according to another embodiment of the present invention.
Figure 11:
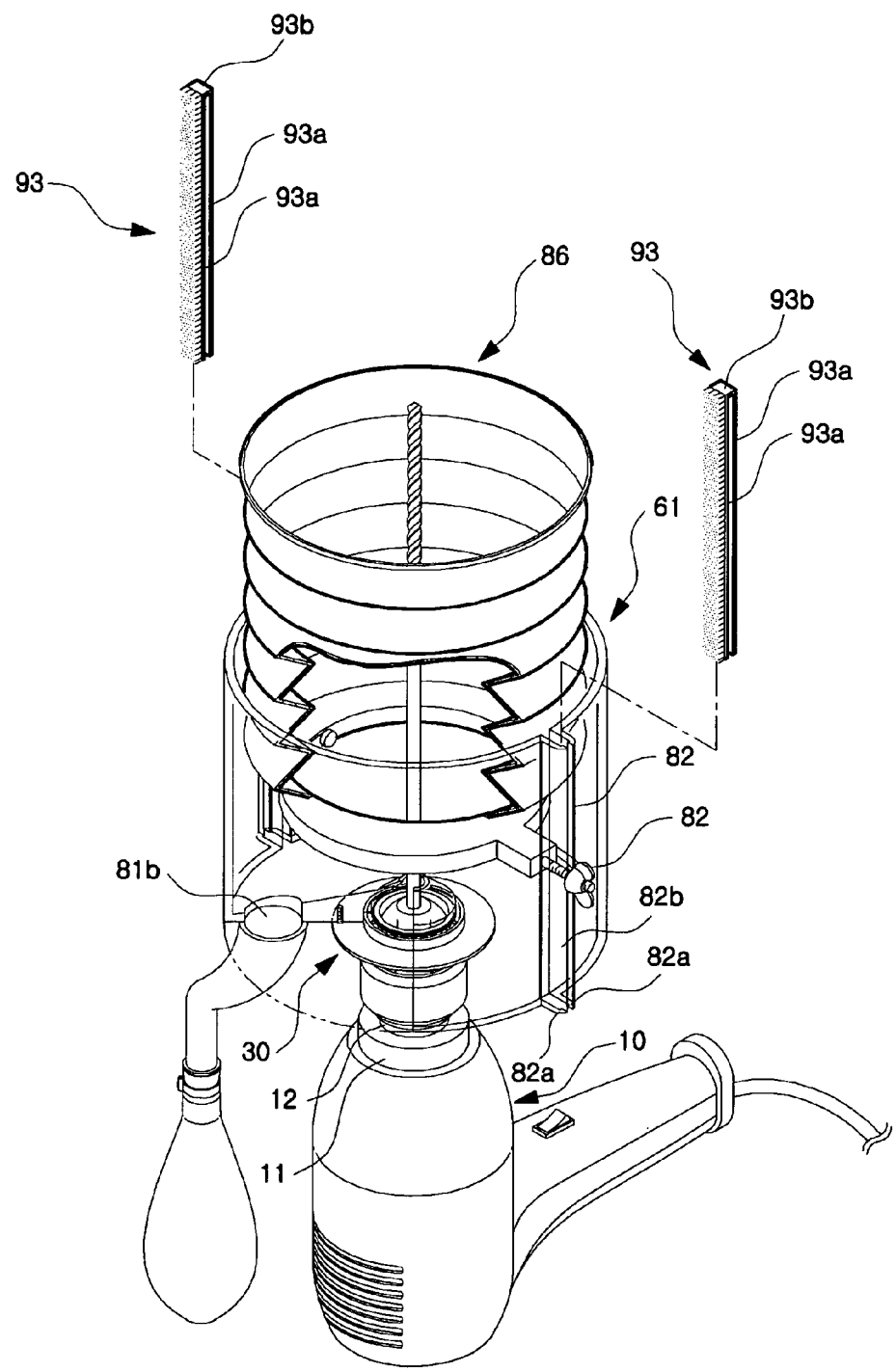
Figure 12:
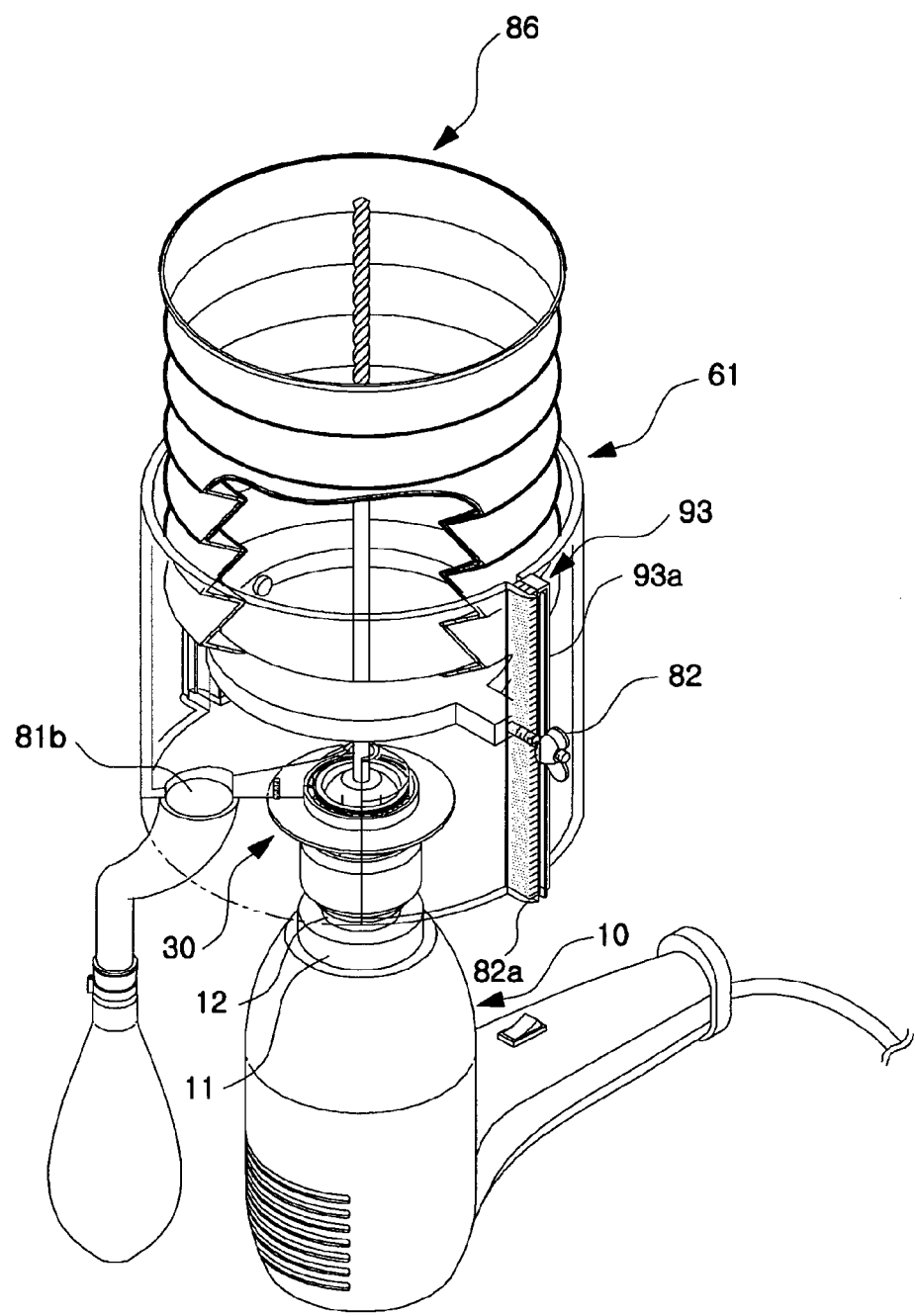
Figure 13:
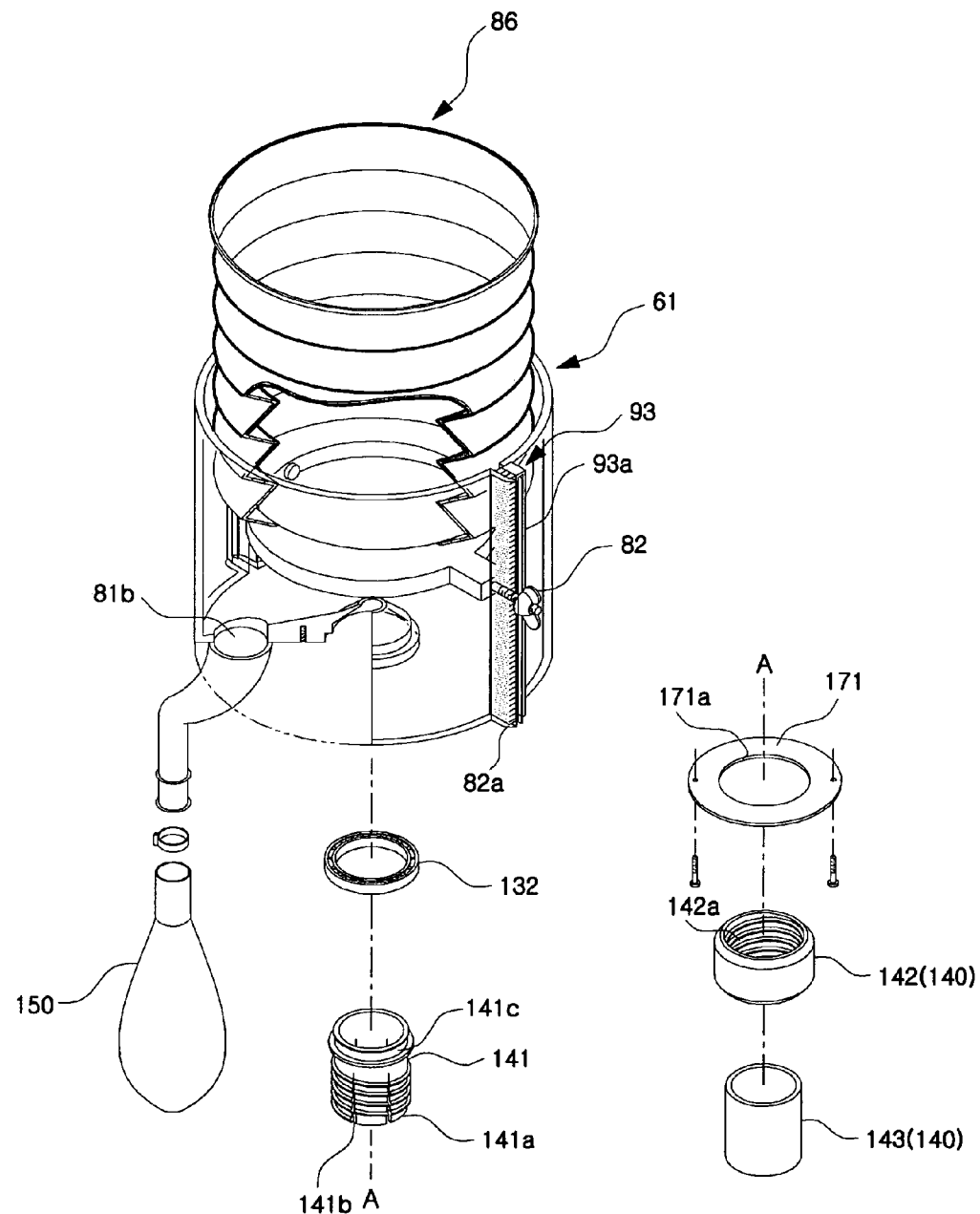
FIG. 13 is a coupled perspective view showing a portable drilling machine according to another embodiment of the present invention.
Figure 14:
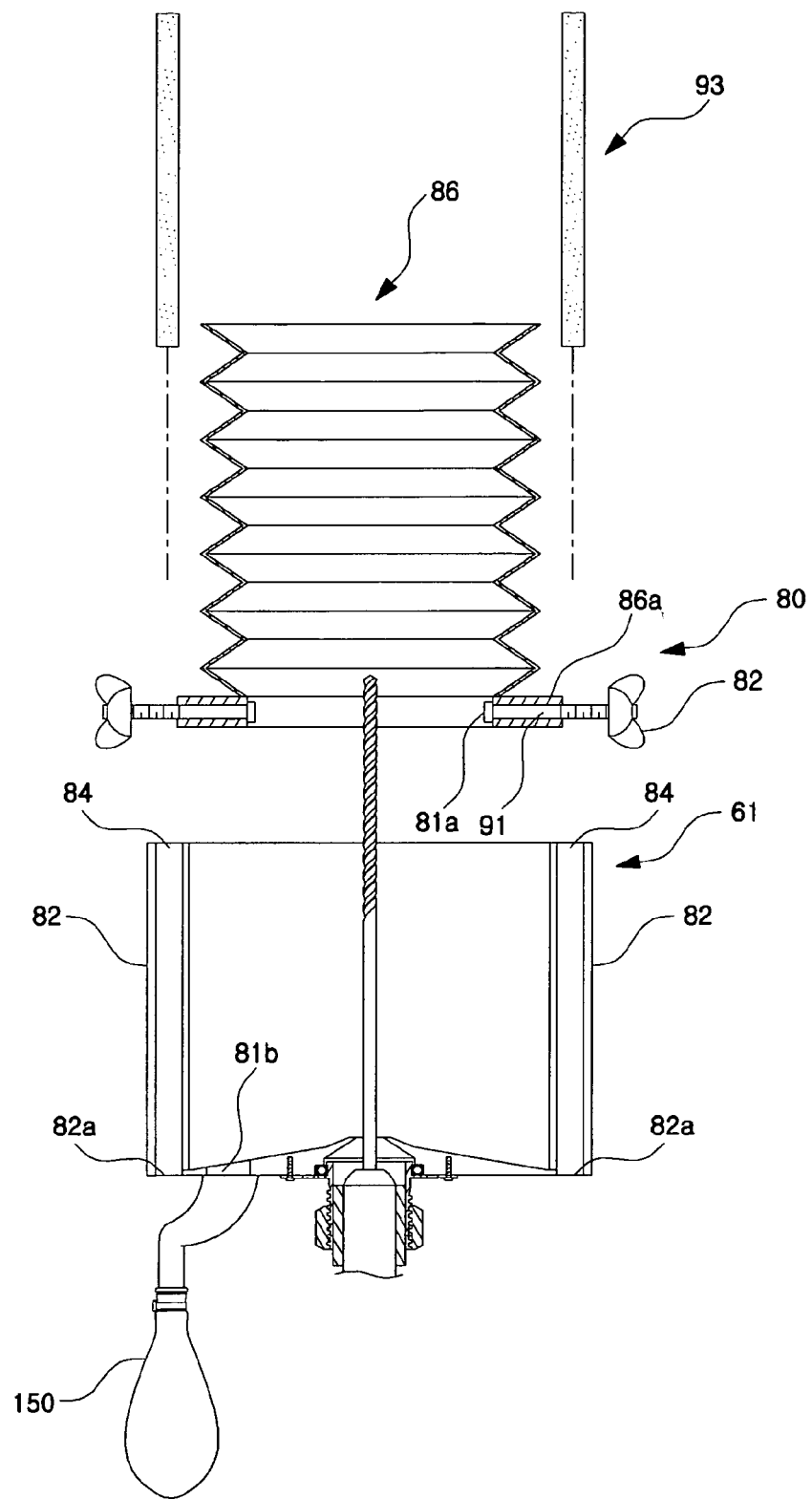
FIGS. 14 and 15 are exploded sectional views showing a portable drilling machine according to another embodiment of the present invention.
Figure 15:
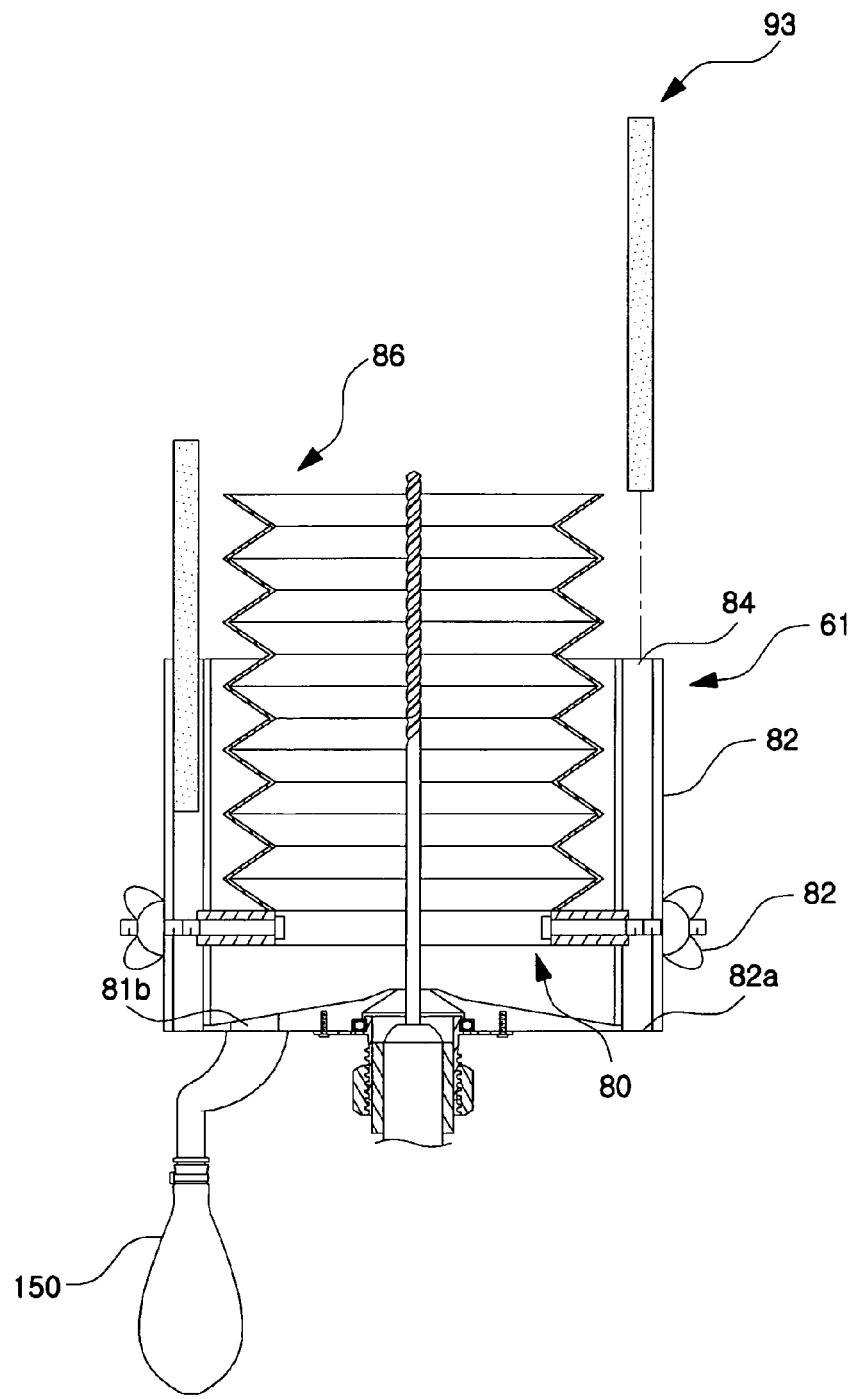
Figure 16:
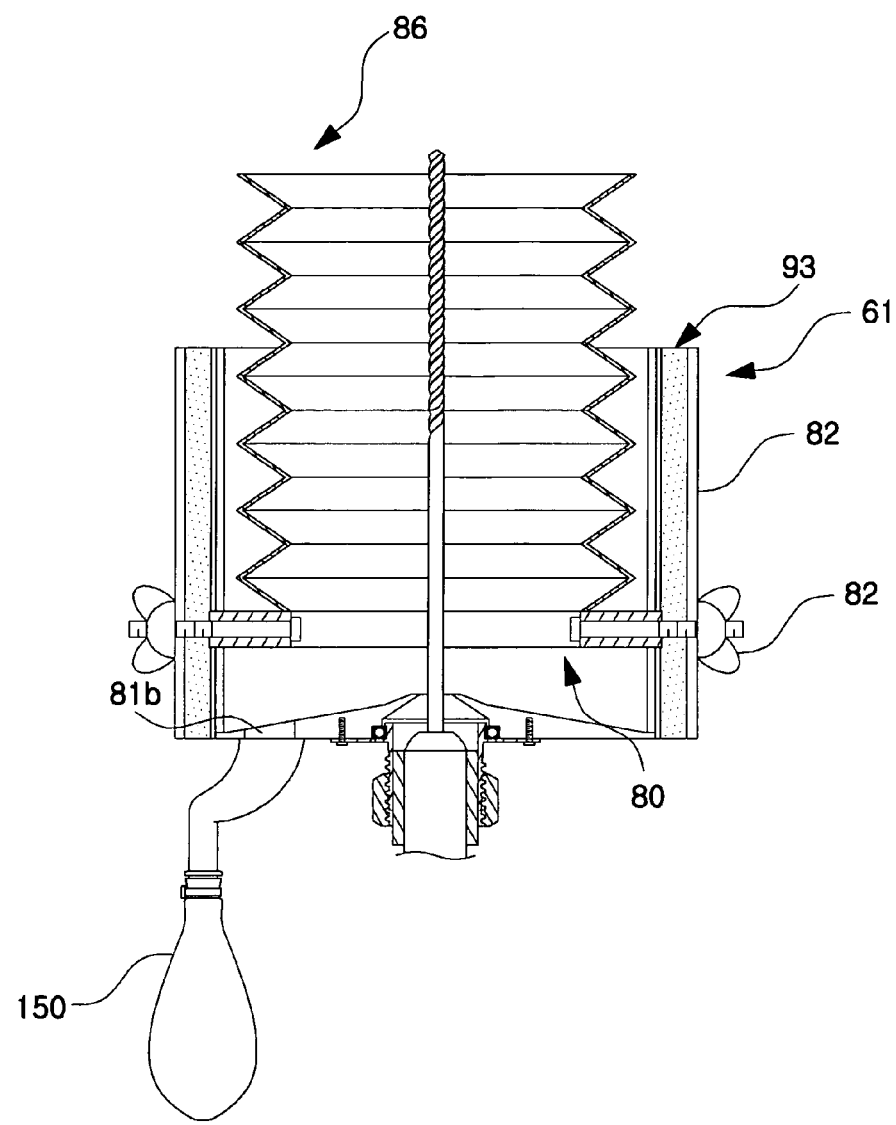
FIG. 16 is a coupled sectional view showing a portable drilling machine according to another embodiment of the present invention.

FIGS. 10, 11, and 12 are exploded perspective views showing a portable drilling machine according to another embodiment of the present invention. FIG. 13 is a coupled perspective view showing a portable drilling machine according to another embodiment of the present invention. FIGS. 14 and 15 are exploded sectional views showing a portable drilling machine according to another embodiment of the present invention. FIG. 16 is a coupled sectional view showing a portable drilling machine according to another embodiment of the present invention.

The portable drilling machine according to another embodiment of the present invention, as shown in the drawings, has the same structure as the portable drilling machine according to the above embodiment, except for the anti-dust cover 80 and the filling members 93. Therefore, the same components as in the above embodiment are given the same reference numerals, and repeated description thereof will be omitted herein.

The anti-dust cover 80 includes a rear anti-dust cover 81 made of a transparent material (e.g. transparent plastic) in the shape of a cup having a circular section to be coupled to a retainer 30 by a bearing 32 and a rear anti-dust cover 86 formed in the shape of a corrugated tube to be coupled to the rear anti-dust cover 81.

The rear anti-dust cover 81 has a drill through-hole 81a formed at the center of the bottom surface thereof and a dust discharge hole 81b formed adjacent to the drill through-hole 81a.

The rear anti-dust cover 81 has a pair of retaining posts 82 formed on the peripheral wall thereof while facing each other.

Each retaining post 82 includes a pair of retaining walls 82a facing each other, so that a linear retaining slot 84 is defined in the longitudinal direction of the rear anti-dust cover 81.

The retaining walls 82a have curved surfaces 82b formed on their free ends, respectively, in such a direction that they approach each other so that the front and rear anti-dust covers 86 and 81 are stably coupled to each other.

The front anti-dust cover 86 is made of a plastic or metallic material in the shape of a corrugated tube and has a pair of coupling flanges 86a formed on the outer surface of the lower end thereof in such a manner that they face each other.

The front anti-dust cover 86 is coupled to the rear anti-dust cover 81 by fastening retaining nuts 82 to fastening bolts 91, the heads 91a of which are inserted via the coupling flanges 86a and the retaining slots 84 to make contact with the inner surface of the front anti-dust cover 86. The installation position of the front anti-dust cover 86 may be selected as desired by moving the coupling flanges 86a in the longitudinal direction of the retaining slots 84.

When acted on by pressure towards the housing 11, the front anti-dust cover 86, which is coupled to the rear anti-dust cover, retracts towards the bottom surface of the rear anti-dust cover 81 and, when the pressure is removed, it extends to the original position.

The filling members 93 of the portable drilling machine according to another embodiment of the present invention include a pair of screening members 93a and a connector 93b for connecting the screening members 93a to each other in the longitudinal direction.

The screening members 93a may have a number of bristles arranged in the same direction.

The filling members 93 are bent in an L-shaped configuration and then mounted in the retaining slots 84 from above in such a manner that the pair of screening members 93a are positioned on both sides of the fastening bolts 91, respectively. Preferably, mounting of the filling members 93 precedes insertion of the fastening bolts 91 into the retaining slots 84.

Figure 17:
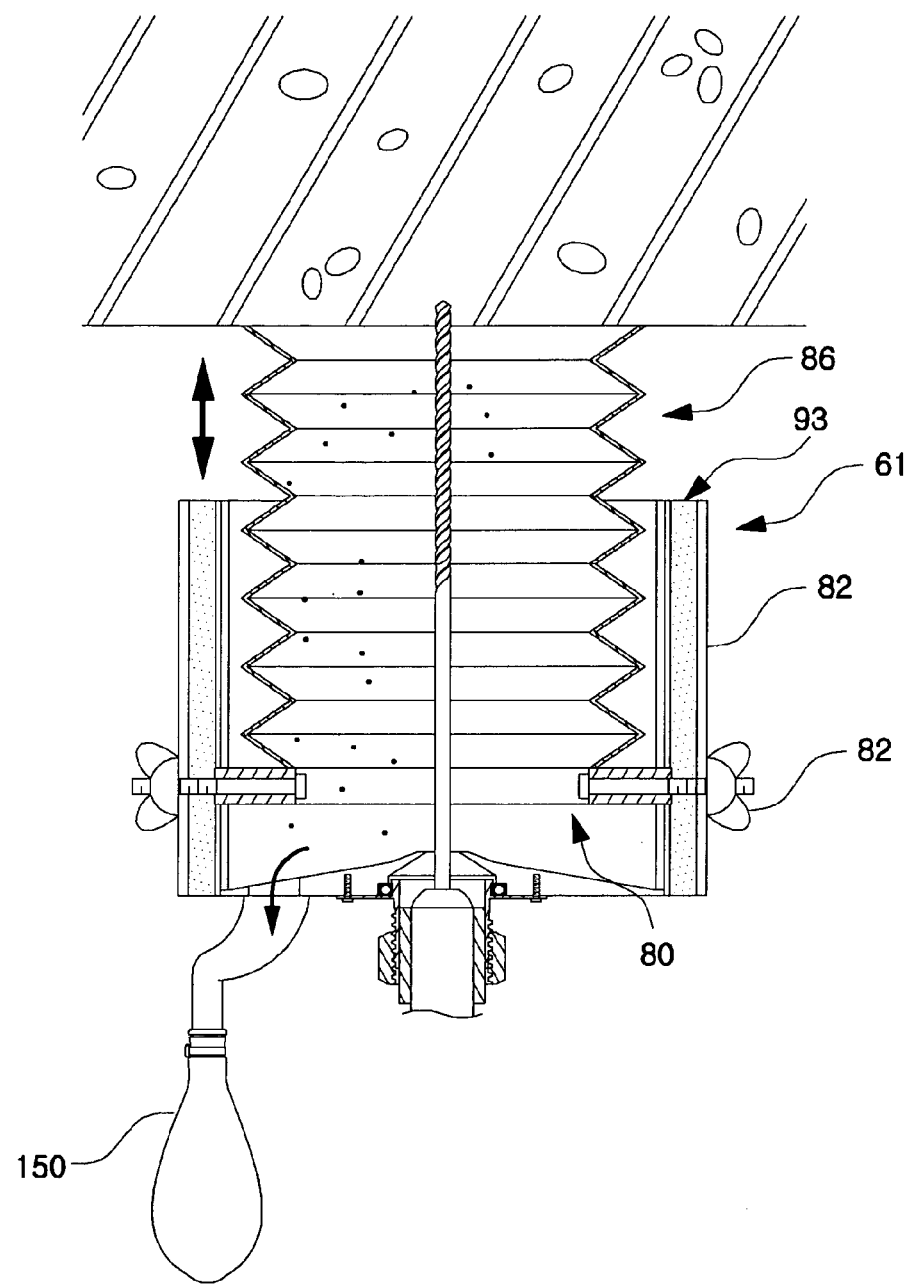
FIG. 17 shows the operation of a portable drilling machine according to another embodiment of the present invention.
Figure 18:
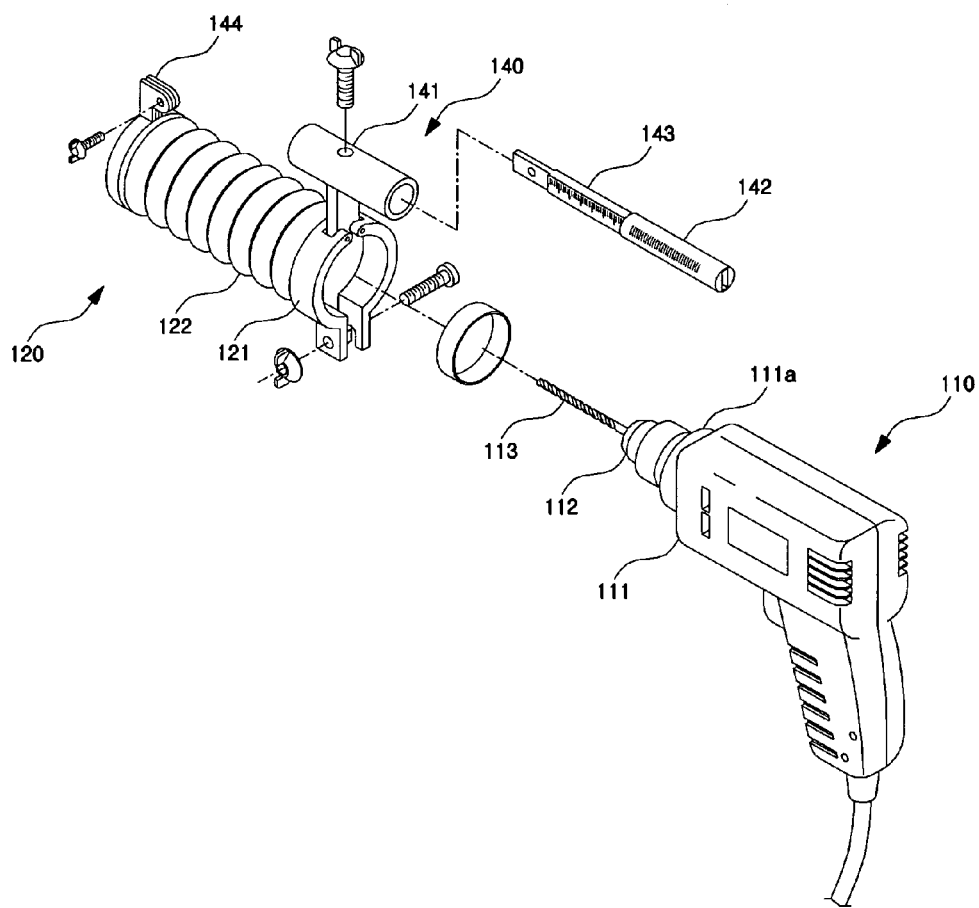
FIG. 18 is an exploded perspective view showing a portable drilling machine according to the prior art.
Figure 19:
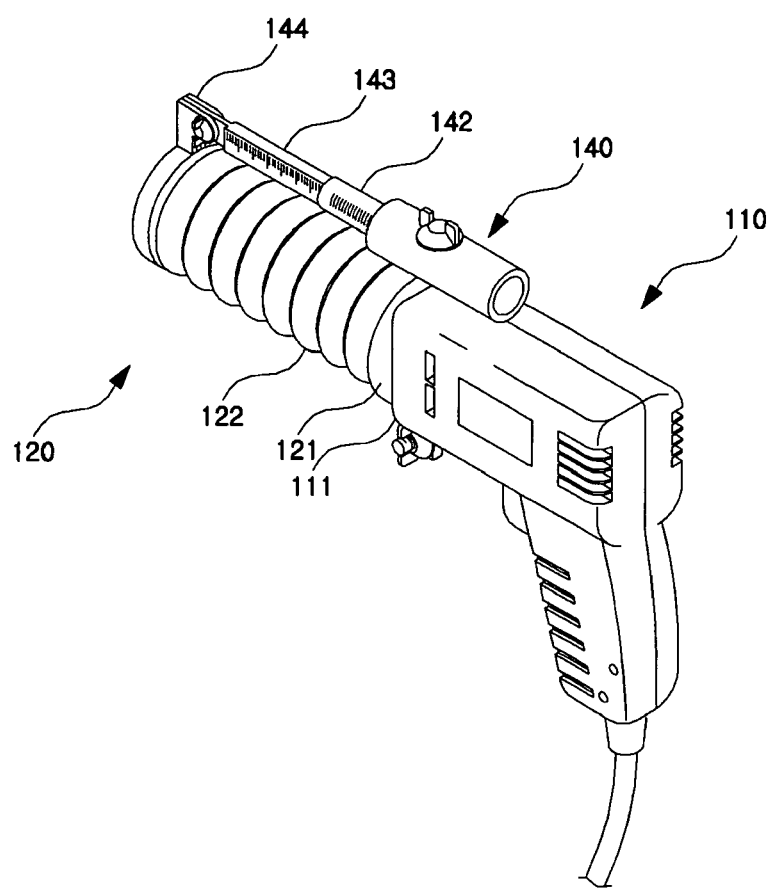
FIG. 19 is a coupled perspective view showing a portable drilling machine according to the prior art.

When drilling operation is to be performed using the portable drilling machine according to another embodiment of the present invention, constructed as above, the front end of the front anti-dust cover 86 is pressed against a to-be-drilled surface so that the front end is kept in contact with the surface. Then, the drill bit 13 or the drill chuck 12 is rotated to perform drilling operation (refer to FIG. 17).

As the drilling operation proceeds, the front anti-dust cover 86 retracts while being pressed against and being kept in contact with the to-be-drilled surface.

When the drilling operation is finished, the front anti-dust cover 86 is separated from the to-be-drilled surface. Then, the front anti-dust cover 86 extends and regains its original shape.

As mentioned above, the portable drilling machine according to another embodiment of the present invention is advantageous in that, since the front anti-dust cover 86 has the shape of a corrugated tube, it can be coupled to the rear anti-dust cover 81 in a simple manner and, even when the direction of movement of the front anti-dust cover 86 is not perpendicular to the to-be-drilled surface, it can retract in a stable manner.

In addition, the front anti-dust cover 86 is coupled to the rear anti-dust cover 81 by fasteners 91, which are inserted into the retaining slots 84 of the rear anti-dust cover 81, so that the degree of extension/retraction of the front anti-dust cover 86 can be adjusted as desired.

The filling members 93, which are mounted in the retaining slots 84, prevent dust, which is collected by the rear anti-dust cover 81, from scattering via the retaining slots 84 and stably maintain the coupling condition of front anti-dust cover 86.

Furthermore, since the filling member 93 include a pair of screening members 93a and a connector 93b for connecting the screening members 93a in the longitudinal direction, the filling member 93 can be easily mounted in the retaining slots 84.

Meanwhile, although the anti-dust cover 60 is made of a transparent material in the previous embodiment, it may also be made of a semi-transparent or non-transparent material.

In addition, although the compression tube 41 is made of a flexible material in the above-mentioned embodiments, it may also be made of a rigid material, such as iron. In this case, the compression tube preferably has structures which are similar to the auxiliary compression grooves 41b, formed on the upper end thereof so that the bearing 32 can be mounted on the compression tube.

Furthermore, although the anti-dust cover 60 is coupled to the drill chuck 12, the anti-dust cover 60 may be coupled to the neck 11a of the housing 11 without using the bearing 32.

As mentioned above, the portable drilling machine according to the present invention is advantageous in that the anti-dust cover includes front and rear anti-dust covers, which are adapted to move relative to each other during drilling operation, so that the drilling operation is not interfered with by the anti-dust cover and the dust collection space is increased.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A portable drilling machine comprising:
a housing;
a drill chuck positioned on a front surface of the housing;
a drill bit detachably coupled to the drill chuck;
a driver positioned inside the housing to provide either the drill bit or the drill chuck with a rotational driving force;
an anti-dust cover having a rear anti-dust cover formed in a cup shape with a drill through-hole formed in a central region of a bottom surface of the rear anti-dust cover and a front anti-dust cover formed in a tube shape to be coupled to the rear anti-dust cover, the front anti-dust cover being adapted to move towards the bottom surface of the rear anti-dust cover when acted on by pressure towards the housing and return to original position when the pressure is removed, wherein the front anti-dust cover is formed as a corrugated tube adapted to retract towards the bottom surface of the rear anti-dust cover when acted on by pressure towards the housing and extend to original position when the pressure is removed; and
a retainer for detachably coupling the rear anti-dust cover to an outer surface of either the housing or the drill chuck,
wherein the rear anti-dust cover has a pair of retaining posts formed on a peripheral wall of the rear anti-dust cover while facing each other and a linear retaining slot defined between the retaining posts in a longitudinal direction of the rear anti-dust cover, the front anti-dust cover being coupled to the rear anti-dust cover by a fastener inserted into the retaining slot.

2. The portable drilling machine as claimed in claim 1, further comprising a filling member mounted in the retaining slot.

3. The portable drilling machine as claimed in claim 2, wherein the filling member has a pair of screening members formed on both sides of the fastener, respectively, and a connector for connecting the screening members to each other along the longitudinal direction.

4. A portable drilling machine comprising:
a housing;
a drill chuck positioned on a front surface of the housing;
a drill bit detachably coupled to the drill chuck;
a driver positioned inside the housing to provide either the drill bit or the drill chuck with a rotational driving force;

an anti-dust cover having a rear anti-dust cover formed in a cup shape with a drill through-hole formed in a central region of a bottom surface of the rear anti-dust cover and a front anti-dust cover formed in a tube shape to be coupled to the rear anti-dust cover, the front anti-dust cover being adapted to move towards the bottom surface of the rear anti-dust cover when acted on by pressure towards the housing and return to original position when the pressure is removed, wherein the front anti-dust cover is formed as a corrugated tube adapted to retract towards the bottom surface of the rear anti-dust cover when acted on by pressure towards the housing and extend to original position when the pressure is removed; and a retainer for detachably coupling the rear anti-dust cover to an outer surface of either the housing or the drill chuck, wherein the retainer has a chuck retainer detachably coupled to the drill chuck so that the chuck retainer can rotate while being interlocked with rotation of the drill chuck and a bearing interposed between the chuck retainer and the rear anti-dust cover wherein the chuck retainer has a compression tube and a fastening tube, the compression tube having a number of fastening ribs formed on an outer surface of the compression tube as threads and a plurality of auxiliary compression grooves formed on an edge of a lower end of the compression tube, the fastening tube having female screws formed on an inner surface of the fastening tube, and the female screws corresponding to the fastening ribs.

5. The portable drilling machine as claimed in claim 4, wherein the chuck retainer has an auxiliary tube made of an elastic material to be mounted on an inner surface of the compression tube.

* * * * *